United States Patent [19]

Goodale, Jr. et al.

[11] Patent Number: 5,894,200

[45] Date of Patent: Apr. 13, 1999

[54] TWO TERMINAL METHOD OF AND APPARATUS FOR IMPROVING ELECTRICAL AND LIGHT PRODUCING EFFICIENCY IN LOW VOLTAGE DIRECT CURRENT INCANDESCENT LAMP INTENSITY CONTROL

[76] Inventors: Garold Joseph Goodale, Jr., 5507 W. Virginia Ave., Lakewood, Colo. 80226; Herbert Wallace Behlow, Jr., 1512 Medinah Cir., Lawrence, Kans. 66047

[21] Appl. No.: 08/827,343

[22] Filed: Mar. 26, 1997

[51] Int. Cl.⁶ .................................................. H05B 37/00
[52] U.S. Cl. ................... 315/360; 315/151; 315/240; 315/307
[58] Field of Search .................. 315/DIG. 4, 360, 315/DIG. 7, 240, 362, 154, 156, 158, 151, 307, 308, 297, 291

[56] References Cited

U.S. PATENT DOCUMENTS

| | | | |
|---|---|---|---|
| 4,379,983 | 4/1983 | Takematsu | 315/151 |
| 5,008,599 | 4/1991 | Counts | 315/240 |
| 5,012,392 | 4/1991 | Hochstein | 315/158 |
| 5,398,065 | 3/1995 | Okino | 348/371 |
| 5,519,287 | 5/1996 | Goodale, Jr. et al. | 315/360 |

*Primary Examiner*—Don Wong
*Assistant Examiner*—Wilson Lee
*Attorney, Agent, or Firm*—Brian D. Smith PC

[57] ABSTRACT

A method for improving electrical and light producing efficiency in two terminal, direct current, low voltage incandescent lamp dimming wherein a small inductance in series with the power source, lamp, and two terminal controller boosts the voltage supplied to the timing circuitry. Accordingly, the voltage level of the controlling signal applied to the insulated gate of the field effect transistor is increased as well, improving electrical efficiency and allowing for efficient use with a wide range of supply voltage, from 18 volts or more down to as low as one volt. Also a technique is provided whereby, even though using only two terminals, lamp intensity is regulated over a wide range of supply voltage excursions, improving light producing efficiency in incandescent lamps. Also, this same technique proportionally reduces current demand when the supply voltage exceeds that of the lamp, affording increased energy extraction efficiency from batteries.

23 Claims, 9 Drawing Sheets

Vdd=6V       Vdd=4V

TWO TERMINAL METHOD OF AND APPARATUS FOR IMPROVING ELECTRICAL AND LIGHT PRODUCING EFFICIENCY IN LOW VOLTAGE DIRECT CURRENT INCANDESCENT LAMP INTENSITY CONTROL

BACKGROUND OF THE INVENTION

This invention relates generally to lighting controls, and more particularly to direct current low voltage pulse width modulated incandescent lamp controllers having two terminals suitable for connection in series with an electrical power source and load.

Techniques for lamp intensity control include several methods and apparatus with which problems and solutions for direct current low voltage pulse width modulated insulated gate dimmers are discussed and disclosed. In U.S. Pat. No. 5,113,120 (Scott, et al.) the timing wave form supply is increased in voltage by a charge pump voltage doubler, thus allowing n-channel field effect transistors to be used in series with the power supply and load. This approach works well for voltages in the 10 to 30 volt range, and at pulse repetition rates of approximately 70 Hz. In U.S. Pat. No. 5,519,287 (Goodale et al.), to which this application is related, the timing wave form is differentiated by a capacitor and stepped up in voltage by an auto transformer, then applied to the gate of the Mosfet. This circuit enables placement of the entire dimmer in series with the power supply and load, allowing operation down to about 3.5 volts, but also has a low pulse repetition rate. With both of these methods the timing wave form produced is not much more than twice that of the supply voltage. And the manner in which the timing circuitry controls the FET results in transitions from On to Off and vice versa of the field effect semiconductor being limited in rapidity, thus requiring a reduced pulse rate as to secure enhanced efficiency. Furthermore, neither of the above methods provide load or power source regulation.

This invention has as one object a means to simply yet effectively increase the timing voltage to many times that of the supply voltage as to afford maximized efficiency by the field effect transistor.

A related object is to allow the option of a relatively high pulse repetition frequency with the attendant advantages of smaller component values, and versatility/flexibility in use with bulbs having small filaments with reduced thermal inertia.

A further related object of this invention is to provide full operation of lamp intensity control down to a supply voltage of 2 volts or less, and with a simple start circuit, down to 1 volt or less. But, with or without the start circuit, the controller is compatible with higher voltage applications of 18 volts or more.

Still another object is to afford a lamp controller having two terminals with input voltage responsive lamp intensity regulation wherein the lamp may be fully dimmed by operator manual control, yet maintain the same brightness over a considerable range of supply voltage.

And again another object is to provide two terminal illumination output responsive lamp intensity regulation with the benefits as just mentioned in the previous object, while retaining the advantages attendant to increased timing voltage.

SUMMARY OF THE INVENTION

Accordingly, the foregoing and other objects are attained by the present invention chiefly by the technique of increasing the voltage supplied to the timing circuitry. N-channel insulated gate field effect transistors (N Mosfet) that conduct with a positive gate voltage (enhancement type) perform optimally when the gate to source voltage is in the 6 to 15 volt range, with some families of these semiconductors, termed logic level power mosfets, obtaining specified conductive state source to drain resistance with a gate to source voltage of 5 volts, or even less. Nonetheless, the source to drain resistance of these is lessened if the gate voltage is greater than 5 volts, and the timing circuitry, with higher voltage, exhibits improved rise and fall time of the timing signal applied to the gate, improving the overall efficiency of the mosfet. The mosfet then better emulates the ideal "knife switch" analogy in which, when the device is ON, it is instantly and fully conductive, and when OFF, it is instantly and totally nonconductive.

To secure these advantages, the invention herein described uses a small means of inductance of less than 100 micro-henries in series with the power supply and the load, and, in conjunction with the two terminal configuration disclosed in U.S. Pat. No. 5,519,287, boosts a voltage which is then rectified and stored in a means of capacitance to supply power to the timing circuitry. This, in turn, elevates the voltage of the timing wave form furnished to control the mosfet. With higher supply voltages and peak currents the multiplying effect is naturally diminished, allowing for a wider range of supply voltage without exceeding the safe operating region of gate to source voltage. The invention in even its simplest embodiment thus is compatible with quite a wide range of supply voltages, boosting the timing voltage at lower supply levels where it is needed most, while allowing the option of higher pulse repetition rates while still maintaining improved efficiency.

Additional applications of this circuit as a current level controller become evident, especially in regard to using a small inductance in series with the power supply and the load for timing supply boost. Some loads would have inherent inductance (motors and the like) that could be used as previously described, and even as speed or load responsive. Others, if predominantly-resistive, could use the series inductor, just substituting another type of load for the lamp.

Still other applications and advantages of the present invention arise with the special case of allowing the series inductance to approach zero. As such, the timing voltage would not be increased, but would then reflect the power supply voltage directly. In such cases, the advantage would be for this voltage to be made available as regulatory feedback to the timing circuit, and accordingly, afford two terminal input voltage responsive lamp intensity control. Any method of regulation obviously would be advantageous for incandescent lamps wherein efficiency increases proportionally with nearly the square of the applied voltage, but whose longevity plummets if design voltage is exceeded. This is especially the case with halogen cycle lamps; a slight over-voltage causes premature failure, but under voltage is inefficient. Existing regulators, however, are three terminal devices, which would be inconvenient to adapt to service in flashlights. And to maintain constant wattage to the lamp, these need be of the switching mode type with its complexity and expense. The two terminal input responsive regulator, contrastingly, lends itself to such use, and thus solves the dilemma in flashlights wherein alkaline cell voltage droop during discharge would quickly negate the advantage of a halogen bulb. A nice corollary to this approach occurs with using a higher voltage battery pack to power a considerably lower voltage rated bulb (6 volts for a 2.8 volt halogen for instance) via the two terminal regulator. This scenario halves the current otherwise required and thus significantly improves the primary cell ampere hour performance (increased energy extraction efficiency) and by maintaining full design temperature of the filament in the bulb over an extended portion of the discharge curve, greater light producing efficiency is realized as well.

Yet another method in providing these efficiency related objects and advantages in lamp control while still retaining the feature of boosted timing voltage is by replacing the manual control of the timing circuit with a photosensitive device such as photo transistor or the like, which, in turn, is exposed to light from the controlled lamp. The circuit easily regulates the lamp's intensity by virtue of this simple feedback loop, and lamp dimming with regulation is readily provided by merely varying attenuation in the light path from the lamp to the photosensitive device. And by exposing the light path to ambient light, the controller responds by reducing lamp intensity when it is not needed, thus promoting battery economy.

These methods and apparatus of the invention in providing greater efficiency in low voltage direct current incandescent lighting such as used for flashlights marshals a three-pronged approach. The first has to do with the electrical efficiency of the controlling device: boost the timing voltage and increase the cycling rate as to allow for efficient use even in very low voltage applications. The second regards the battery: reduce the current demand and thus maximize its efficiency and extend its life. The third involves the light bulb itself: keep the filament as hot as possible without burning it out, and therefore maximize light producing efficiency. And all of these above advantages are accompanied by the additional convenience of having the lamp controller connected solely in series with the load and the power supply, requiring no other electrical terminals or connections.

Still other objects and advantages of the present invention will become apparent to those skilled in the art by referring to the detailed description and accompanying drawings, wherein we have shown and described what we believe to be exemplary modes for carrying out our invention. As will be realized, the invention is capable of modification in a variety of obvious respects, all without departing from the invention. Accordingly, the following drawings and description are to be regarded as contemplative and illustrative in nature, and not as restrictive.

DETAILED DESCRIPTION OF THE DRAWINGS

Throughout the schematics described below (FIGS. 1-5) terminals T1 and T2 indicate a means suitable for connecting the invention in electrical series with a series connected power source and load. Also, timing device 65 is the cmos version of the NE555 timer (7555 or equivalent).

Figure 1:
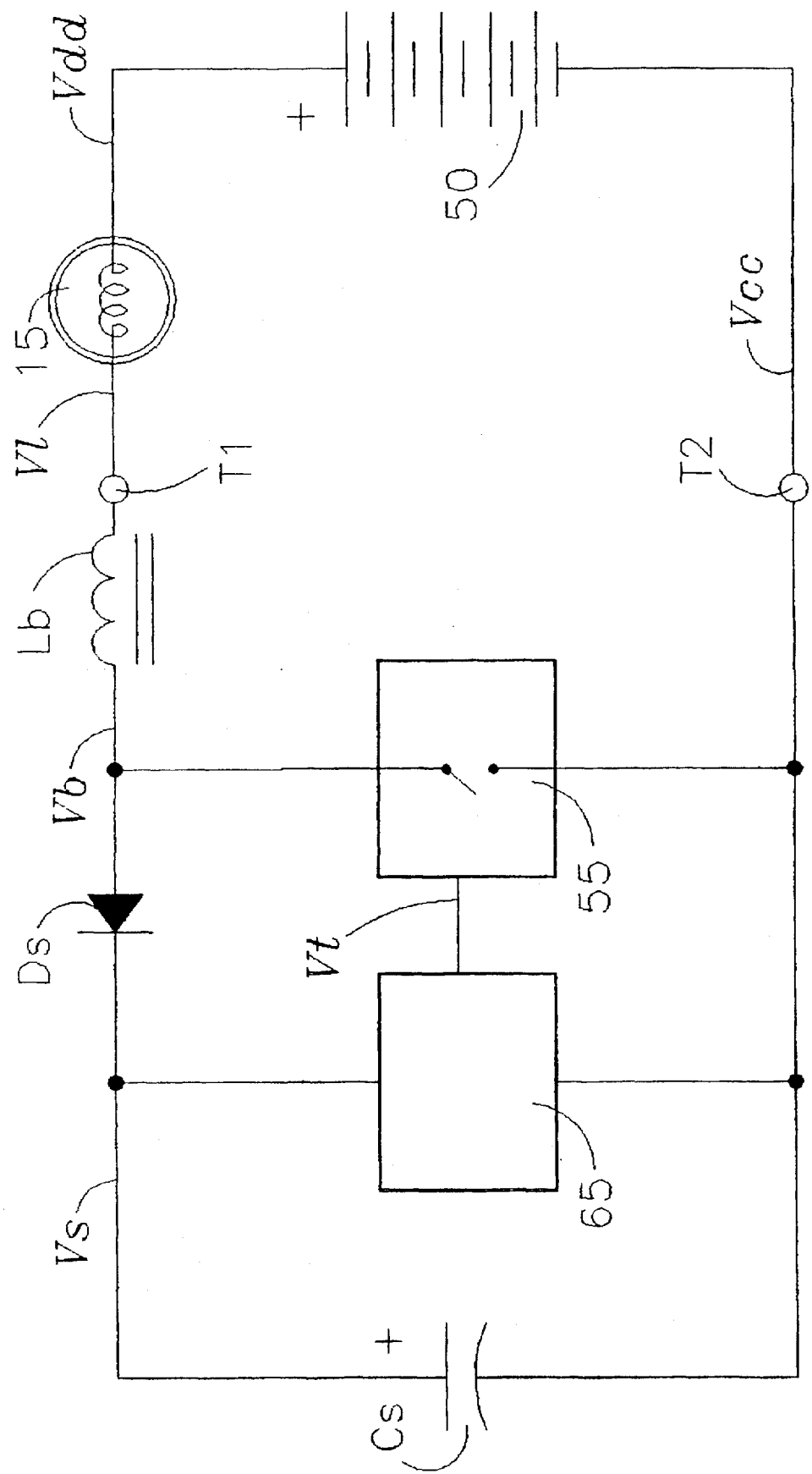
FIG. 1 is a functional block diagram of a preferred embodiment of the invention.
Figure 6:
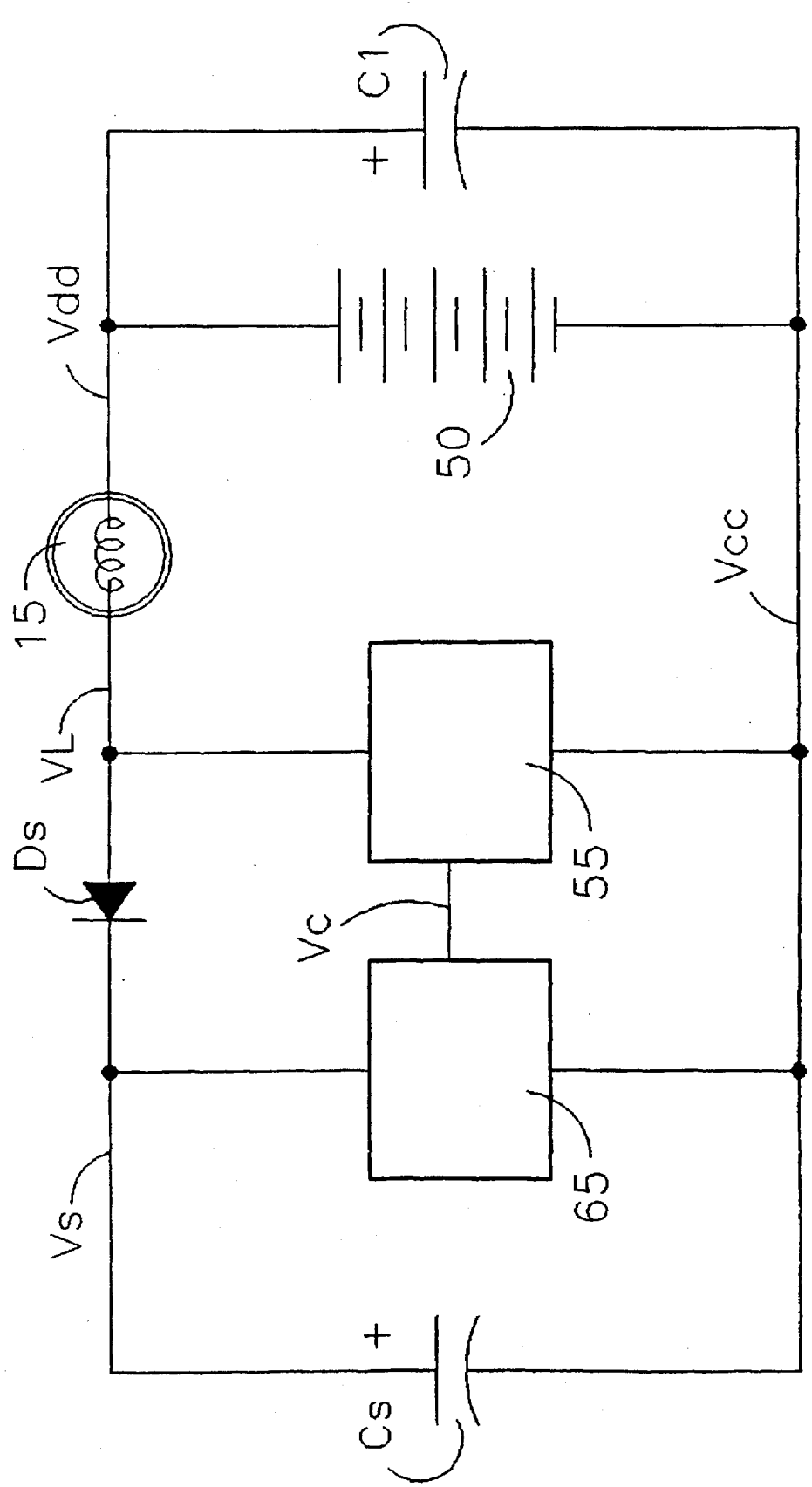
FIG. 6 is a functional block diagram of related art (U.S. Pat. No. 5,519,287).
Figure 7:
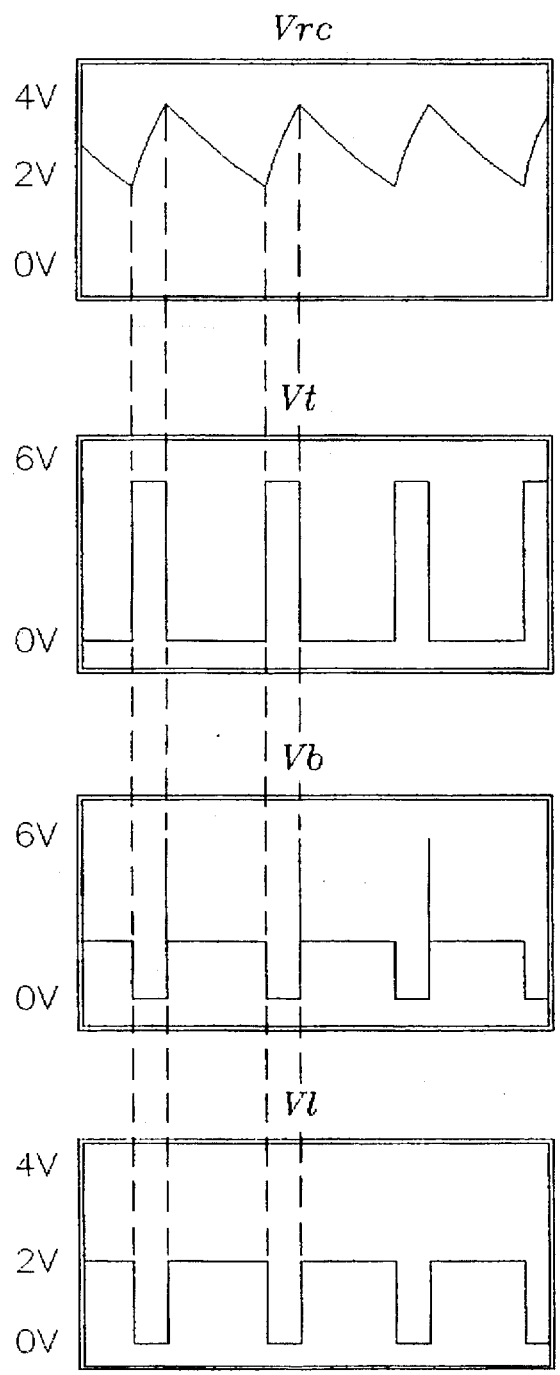
FIG. 7 is a series of wave form diagrams illustrating the operation of the embodiment depicted in FIG. 1-3.
Figure 7:
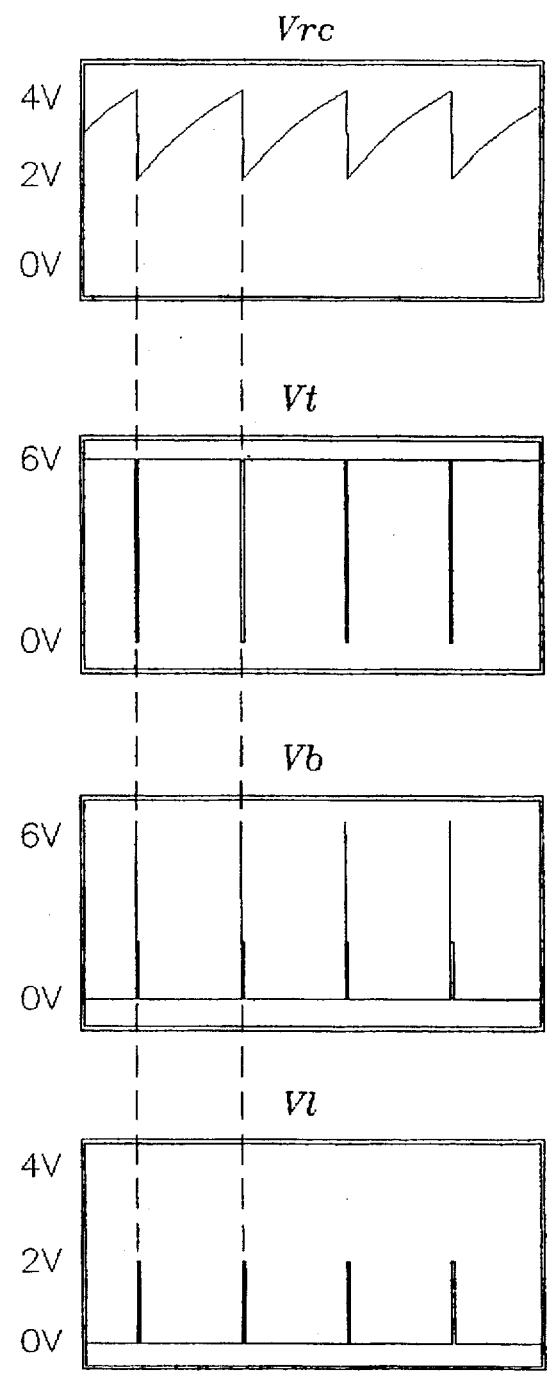
Figure 8:
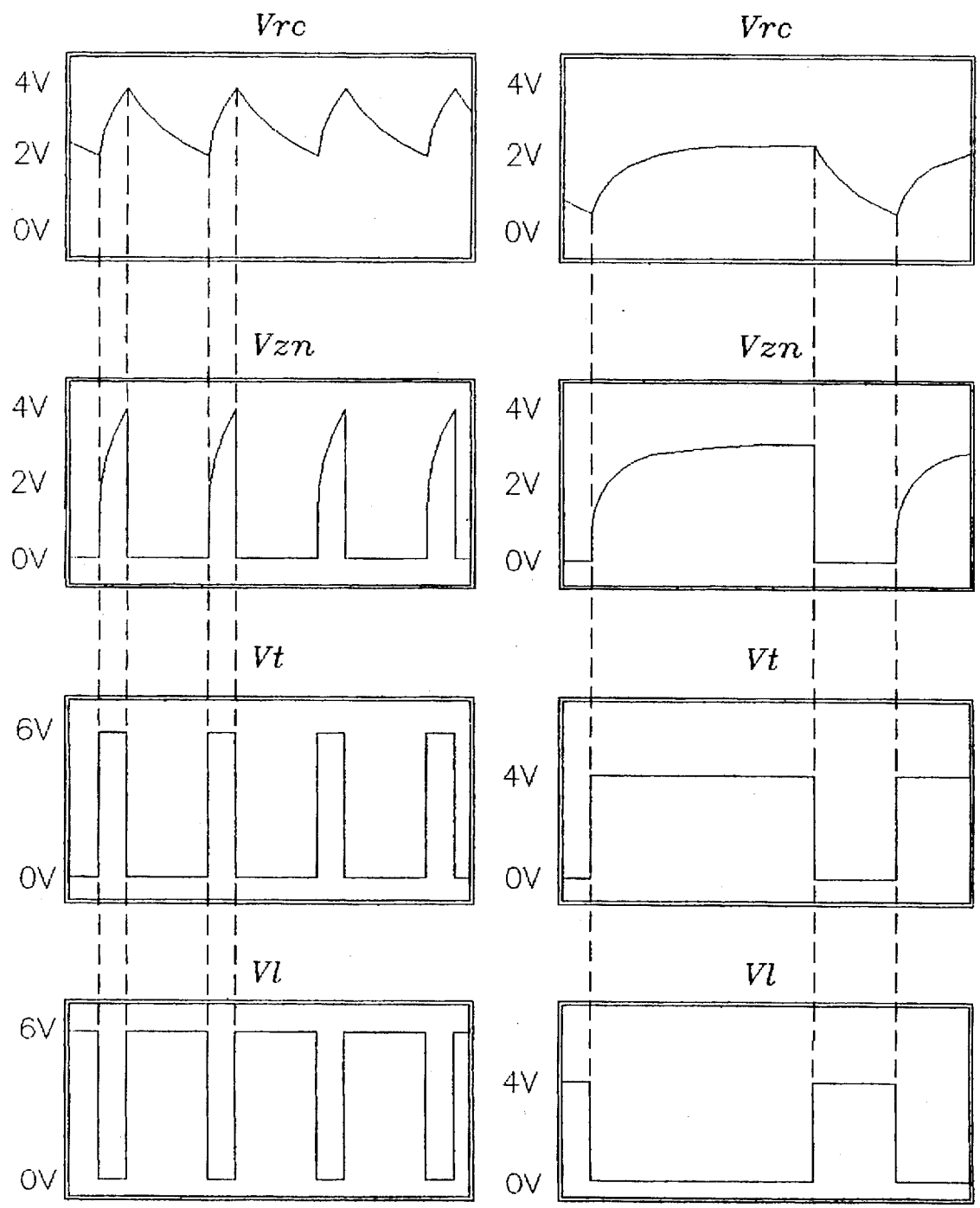
FIG. 8 is a series of wave form diagrams illustrating the operation of the embodiment depicted in FIG. 4.
Figure 9:
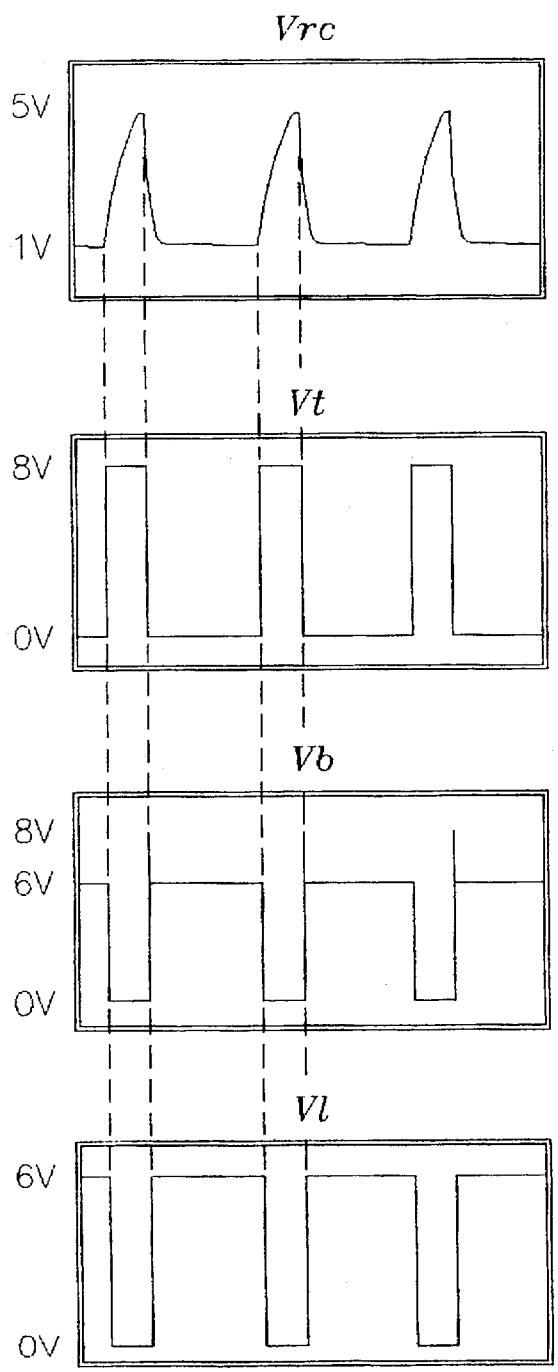
FIG. 9 is a series of wave form diagrams illustrating the operation of the embodiment depicted in FIG. 5.
Figure 9:
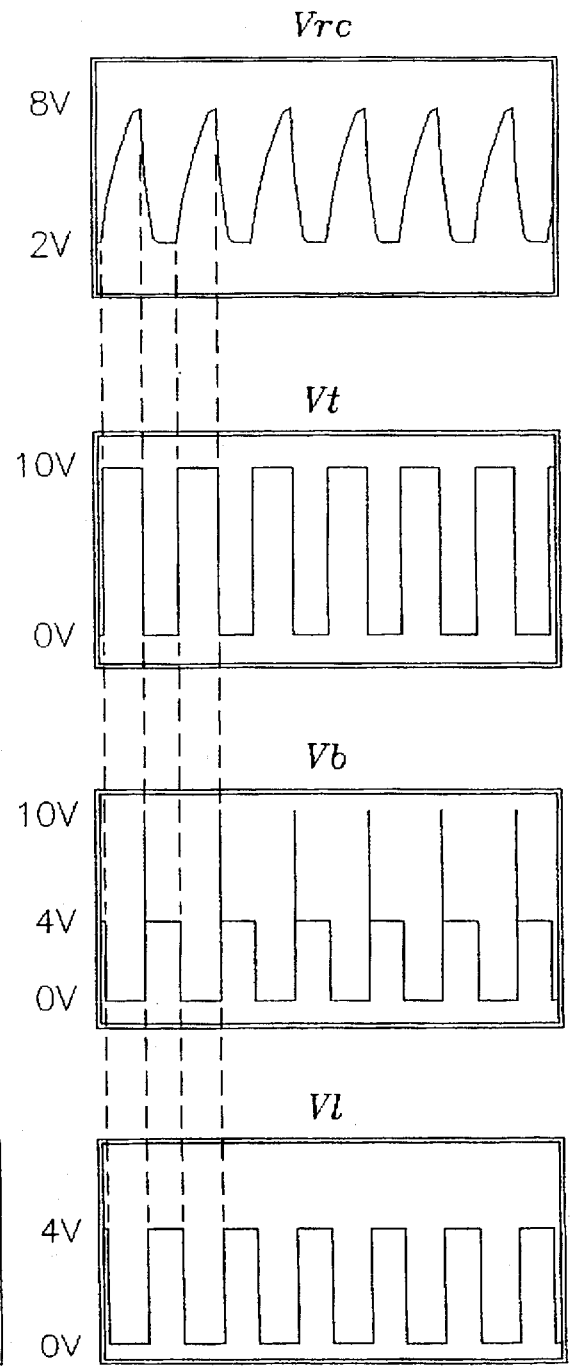

Begin by referring to FIG. 1 in which the principle function of the invention as well as a preferred embodiment is outlined, and also refer to FIG. 6 which is the functional block diagram of U.S. Pat. No. 5,519,287. One immediately sees how similar the block diagrams are, only differing in power supply bypass capacitor C1 (missing in FIG. 1) and inductor Lb (connected in electrical series with the power source, lamp, and switch in FIG. 1). In most respects, these two circuits function the same; lamp intensity is established by the ratio of ON/OFF cycling of switch 55 as controlled by timing device 65 wave form Vt. Operator adjustment of timing device 65 allows for varying the lamp intensity. This operator controlled adjustment could be one of a variety of means for varying the timing device: a Hall effect device, digitally formatted control, or light sensitive detector, as well as a simple variable resistor. U.S. Pat. No. 5,519,287 claims the novel technique of deriving timing circuitry power during the Off cycle by means of rectification (diode Ds) and storage (capacitor Cs). The present invention uses the same basic means for deriving timing circuit power, but unlike in FIG. 6, the current during the On cycle is routed from the power source positive Vdd though inductor Lb (four turns of #24 ga. enameled wire on a 0.3"×0.3" manganese-zinc ferrite bead=70 μ-Henries) in series with lamp 15 and switch 55. As is the case with components exhibiting inductance, energy is stored in and surrounding the inductor by the magnetic field created by current flow through the component, and can subsequently be retrieved when the applied voltage that caused the current to flow ceases. At that instant, the magnetic field begins to collapse, and in so doing, maintains the current flow in the same direction as was previously produced by the applied voltage. This phenomenon, depending upon the rapidity of voltage transition from on to off and also to the impedance that the associated circuitry presents to the inductance, can multiply the voltage for an instant to many times that of the supply voltage. This action, commonly called "Inductive kick", has as its most familiar application the automobile ignition coil, whereby 12 volts is boosted to many thousands of volts for the spark plugs in gasoline engines. Likewise, inductor Lb in FIG. 1 stores energy as the current passes through it from the power supply via load 15 and switch 55 during the On cycle; immediately upon the beginning of the Off cycle, inductive kick occurs by virtue of the inductor's stored energy as described above. At that moment, due to switch 55 rapidly going from On to Off, and also by use of a cmos logic timing device in which the circuit impedances are very high, the inductive kick is considerable, and as configured in FIG. 1, the boosted voltage Vb, developed in electrical parallel with switch 55, is retrieved through diode rectifier Ds and is then stored in capacitance Cs as Vs. Of course this action occurs many hundreds of times a second, providing timing device 65 with optimal supply voltage, up to five or six times that of Vdd when Vdd is at lower voltage. In turn, timing output voltage Vt is increased as well, securing several of the objects and advantages of the invention.

Figure 2:
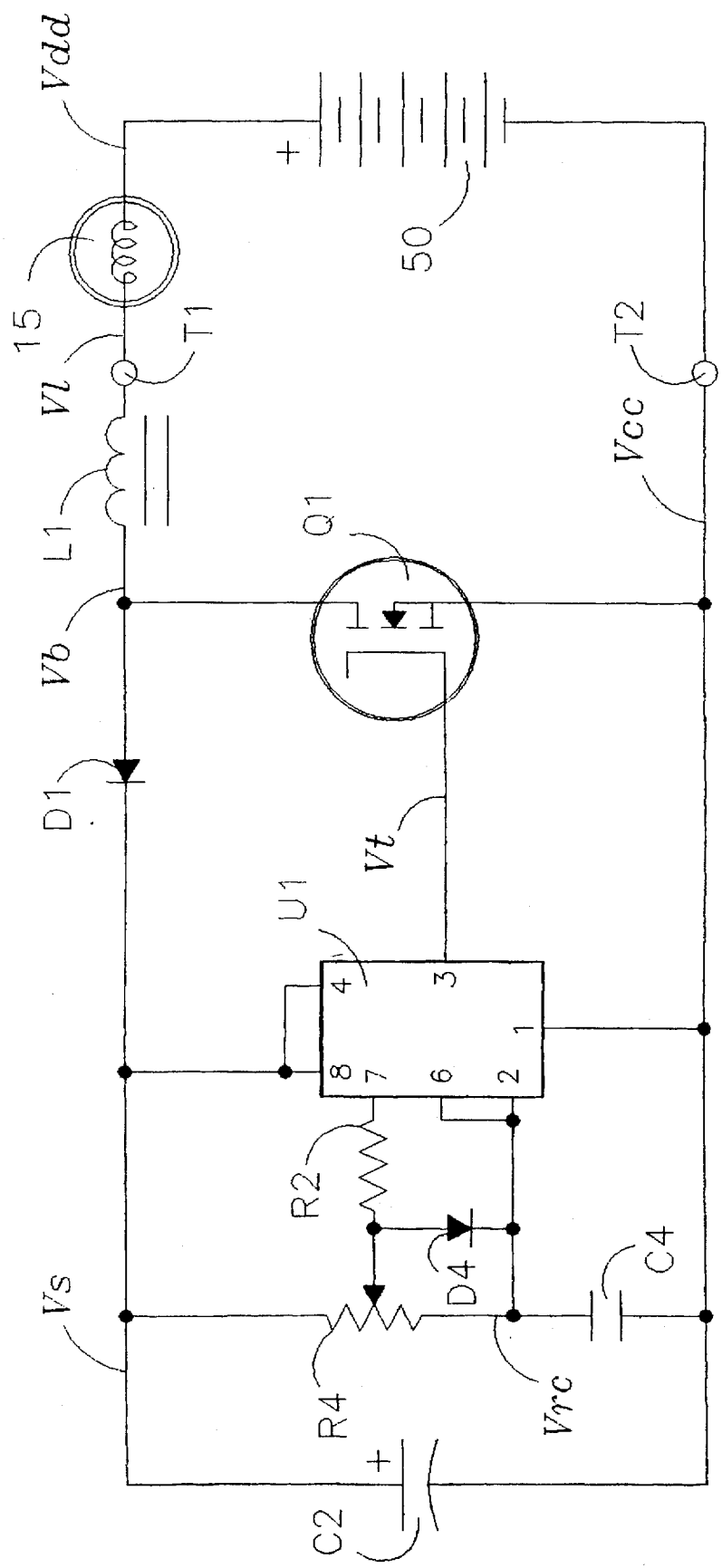
FIG. 2 is a schematic diagram of a preferred embodiment of the invention.

Referring next to FIG. 2 wherein a preferred embodiment of the invention is detailed, again battery (50) supplied current proceeds from Vdd through lamp 15, inductance L1, switch Q1, returning to battery 50 via Vcc. Upon the initial Off cycle, V1 and Vb peak at Vdd, and is rectified by D1 and stored in capacitor C2 at voltage Vs, powering timing integrated circuit U1. Timing wave form Vt is derived from U1 and associated circuitry C4, R2, and D4. With the wiper contact of R4 uppermost, connecting the junction of R2 and D4 to Vs, U1 is in quiescent state; no wave form Vt is produced and lamp 15 is fully dimmed. As the wiper is moved away from Vs, a discharge path from bottom pin 7 of U1 through R2 and the bottom portion of R4 below the wiper begins to occur, reducing the voltage across C4 and pins 2 and 6 of U1. Upon reaching internally set trigger level of U1 pin 2, Vt goes from zero volts to the voltage of Vs. Pin 7 of U1 then ceases to discharge, allowing C4 to begin charging back up in voltage via the top portion of R4 and D4 until reaching internally set threshold voltage of U1 pin 6, whereupon timing wave form Vt returns to zero volts, pin 7 resumes discharging C4 to repeat the timing cycle at a rate selected by the component values of C4 and R4, with the wave form ratio of On/Off cycling controlled by the wiper of R4. Timing wave form Vt directly controls switch Q1 which consequently cycles on and off. Current then flows through lamp 15 and L1 from the power supply 50 via Q1, and, as described before, inductive kick produced by L1 multiplies Vb to several times that of V1 upon Q1 transitioning from on to off. D1 then rectifies Vb and stores it in C2 (boosted Vs), resulting in a boosted Vt.

Figure 3:
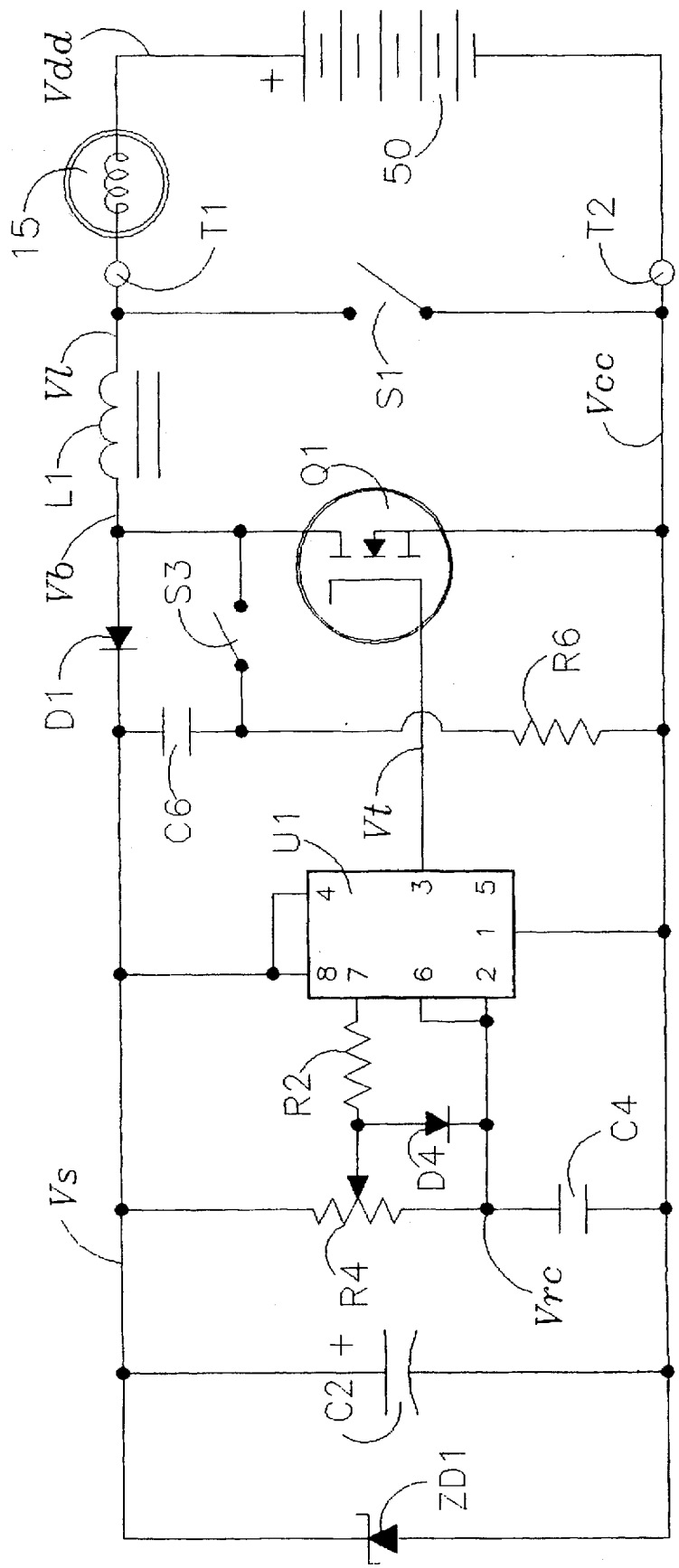
FIG. 3 is a schematic diagram of an embodiment configured for extended range of operating voltage.

Now refer to FIG. 3 in which an embodiment configured for extended operating voltage is depicted, noting in particular zener diode ZD1 in parallel with C2. This zener diode provides protection against excessive voltage being applied to the timing circuitry and insulated gate of switch Q1, as could result from inadvertent short circuit conditions occurring in which not only the inductance of L1 would boost Vb but also the distributed inductance of wiring to and from the switch Q1, lamp, and power source. The ferrite core inductor, as discussed before, tends toward saturation with increased current which would limit its contribution to inductive kick, but as would be the case with a short occurring across lamp 15, the distributed inductance of the series connected circuit can skyrocket Vs to 30 volts or more, which is beyond the timing circuit and FET gate rating. As a safeguard, zener diode Zd1 limits Vs to 20 volts.

Note momentary contact switch S3 along with C6 and R6. These serve as a voltage multiplying start circuit for extending operation of the circuit down to a supply voltage of one volt or less. One could conceivably use a battery to start the circuit, but the above is more reliable in that it is passive. C6 charges through R6 to nearly Vdd via lamp 15, L1, and D1 (Schottky diode). Briefly depressing switch S3 connects the junction of C6 and R6 to Vb, and thus the charge of C6 is placed in series with Vb, quickly charging C2 to nearing twice the initial voltage of Vdd (the capacitance of C6 about ten times that of storage capacitor C2). This allows switch Q1, if a logic level type FET, to begin conducting. With the on/off cycling and boost as related before, upon release of S3, timing supply voltage Vs quickly bootstraps up to five or more volts even though Vdd began at one volt or less.

Finally with regard to FIG. 3, note bypass switch S1 in parallel with the entire dimmer. This switch, if on, of course would cause full brightness of lamp 15 to occur, and has the function of allowing such in spite of the small voltage drop that exists across switch Q1 even with the wiper of R4 positioned to full bright. A small off cycle must be allowed to continue as to permit two terminal configuration of the dimmer (powers the timing circuit), plus there is the minimally dissipative I²R loss of Q1, source to drain. This voltage drop at one amp of current through the dimmer is only one tenth of a volt or so, and could be accommodated in specifying the bulb's voltage rating accordingly. For the most part, S1 would serve well in low voltage environments such as two cell flashlight use in which S1 could be ganged with and turn on at the full brightness end of adjustment R4, affording full range of intensity control.

Figure 4:
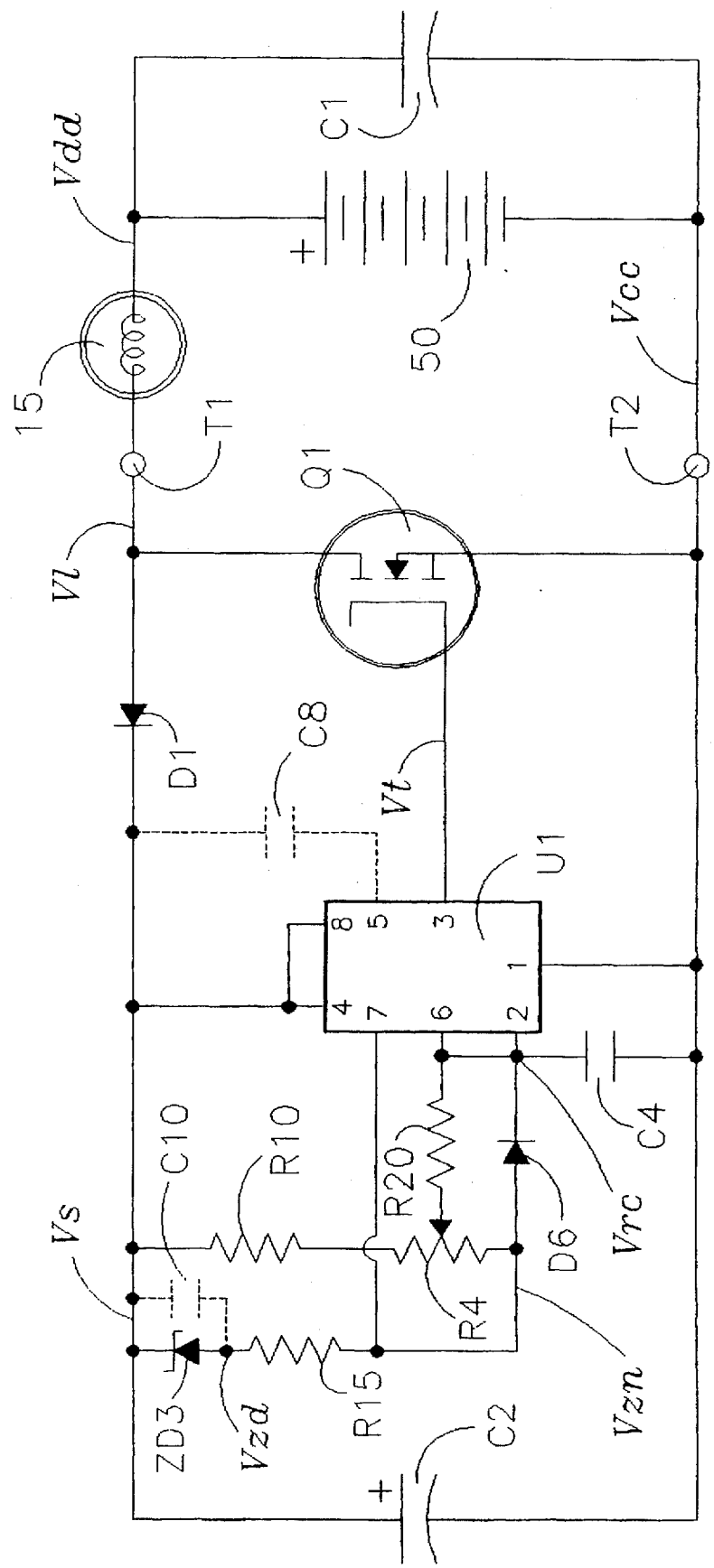
FIG. 4 is a schematic diagram of an embodiment configured for input voltage responsive lamp intensity control.

At this juncture, refer to FIG. 4 in which an embodiment for an input voltage responsive lamp intensity regulator is delineated. Note that inductor L1 is missing and that power source 50 is shunted by capacitor C1. Aside from providing the increase of electrical efficiency as claimed in U.S. Pat. No. 5,519,287, this capacitor keeps the electrical power source voltage relatively constant during both the On and the Off cycle of Q1, which voltage would otherwise tend to surge higher during the Off cycle due to battery droop and internal impedance. This voltage, Vdd, briefly appears across Q1 via lamp 15 and is retrieved by D1 and stored in C2 as Vs. Thus Vs not only powers U1, but serves as a sample of battery/power-source voltage Vdd, C1 ensuring that Vs represents what Vdd is under load. This sample voltage Vs introduces controlling feedback to the cathode of zener diode ZD3 as well as to pins 4 and 8 of U1, which, along with supplying power, determines the voltages where threshold and trigger occur, at two thirds and one third of Vs for pins 6 and 2, all respectively. The arrangement of threshold and trigger in conventional timing circuits ensures that the timing will be independent of supply voltage. But by substituting a portion of the resistance in the R-C time constant timing circuitry with a zener diode or its equivalent, one can see that the ratio of On to Off will change as supply voltage changes, and it is this phenomenon that we use to advantage.

As with the dimmer in FIG. 2, R4 controls the lamp intensity, and with the wiper uppermost, the circuit is quiescent. For sake of discussion, assume that wiper of R4 is fully downward, and that the timing cycle has just transitioned to Off. C4 would have just received a charge sufficient for threshold of U1 to occur (two thirds of Vs) and now will begin discharging through R20 to pin 7 of U1 via wiper of R4. This Off cycle period remains constant. However, upon C4 discharging to one third of Vs, trigger occurs, beginning the On cycle, which will continue until C4 is charged back up to two thirds of Vs via ZD3, R15, and D6, providing the voltage dependent On cycle. The series network of ZD3 (shunted by C10), R15, and D6 is the primary charging path for C4, and, with a low voltage Zener diode or LED (ZD3) in series with a 1000 ohms or so (R15), can be adjusted to produce an on-time which varies inversely with the square of the voltage applied to the network. The means for deriving this function stem from diodes having dynamical as well as static slope resistance which varies considerably at currents well below those rated for typical zener use as a voltage reference, or standard diode forward bias voltage drop. At these very low levels of current the voltage drops are considerably less than rated, yet the diodes still conduct sufficiently as to afford voltage controlled resistance. This allows the zener network to maintain control of the On cycle duration over a wide range of Vdd (4 to 8 volts), in accordance with an inverse square relationship. And it is this inverse square relationship that is used by the controller to keep the lamp brightness constant. If the wattage is to remain the same, the ratio of On cycle to total cycle needs to be proportional to the square of the ratio of the lamp rated voltage to the supply voltage. This function is derived from Ohm's law in which, if the applied voltage potential is halved, the resulting current also is halved, thus four times as great a pulse width of that half value current would be needed to keep the wattage to the load the same (a square proportionality). The R-C time constant emulated by this zener network along with C4 therefore elegantly supplies this needed voltage controllable duty cycle ratio, with R20 and R15 adjusted in value as to set both the full brightness level and regulation tracking linearity of wattage to the lamp. This regulating feature could also be implemented by an operational (linear) amplifier, digital means (look-up table, etc . . . ), or by utilizing any component exhibiting this non-linear characteristic (J-FET, light emitting diode, for instance). As mentioned before, the regulation is by virtue of Vs being applied to U1 and the cathode of ZD3. R10 sets the range of dimming control of R4, and at about 150 kohms establishes fully dimmed operation with the wiper at the upper extreme of R4. In that the lamp rated voltage can be considerably less than the supply voltage, capacitor C8 is recommended to ensure timing stability upon initial turn-on, and thus protect the lamp. Capacitor C10 allows for regulation to continue all the way down to the supply voltage equalling the lamp rated voltage. With it bypassing ZD3, diode D6 contributes the dynamical slope resistance whereas Zd3 then just provides a reference voltage. In addition, although timing voltage boost can be separately configured, this embodiment for simplicity's sake does not boost the timing supply voltage, thus a logic level mosfet or bipolar transistor is necessary to perform over the voltage range above indicated.

As is typical for voltage drop across low voltage zener diodes, a negative temperature coefficient prevails. This causes the wattage supplied to the lamp to increase somewhat with lower ambient temperature, but in that the Off cycle is determined by R20, one can readily compensate temperature effects on regulation by substituting a negative temperature coefficient thermistor network in place of R20. In this manner the On and Off cycles are symmetrically changed by thermal excursions, and thereby the lamp controller exhibits stability over a wide range of temperature (−10 to +60° C.). And by using an LED as voltage reference diode ZD3, thermal effects are minimal, accomplishing the above performance without the use of a thermistor network.

Figure 5:
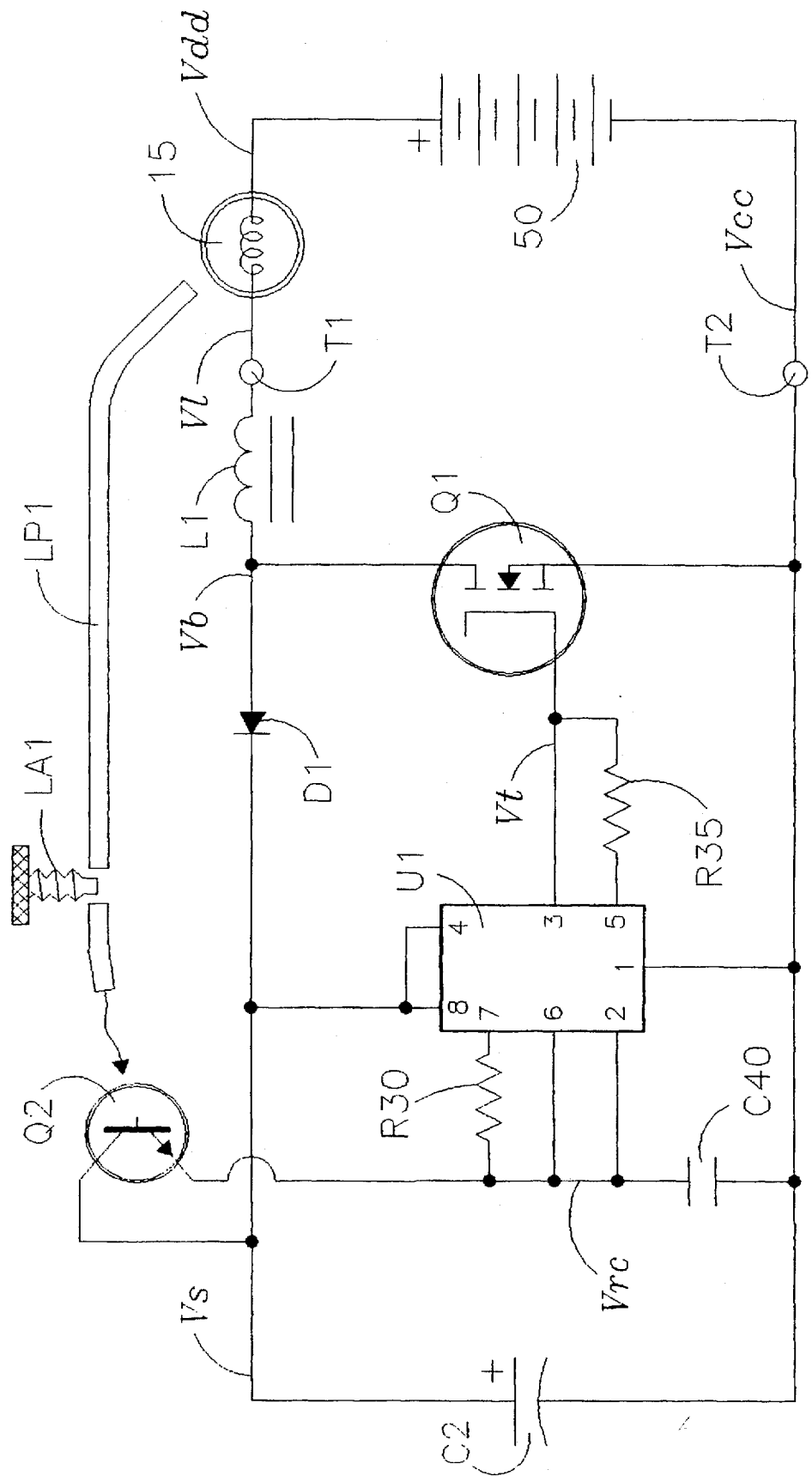
FIG. 5 is a schematic diagram of an embodiment configured for illumination output responsive lamp intensity control.

Finally referring to FIG. 5 wherein an embodiment configured for illumination output responsive lamp regulation is shown, one again notes the presence of L1 and the absence of C1, although C1 would in no way impair the function of this lamp control circuit, but would improve efficiency. Comparing FIG. 5 with FIG. 2, one immediately notices the substitution of light sensitive device coupled to U1 (photo transistor Q2) in the place of potentiometer R4 and diode D4. A small cadmium sulfide cell works nearly as well. Light path LP1 optically couples lamp 15 to Q2. A fiber optic means could suitably furnish this light path as well as simple proximity of Q2 to 15. Light attenuator LA1 adjustably shutters the light path, affording operator control of the light feedback path, and thus the level of illumination intensity, with regulation, of lamp 15.

Upon applying power source 50 to this circuit, Q1 does not conduct until C2 has attained sufficient charge via lamp 15, L1, D1, and back to Vcc. At that instant, timing voltage Vt enables Q1 to conduct, which in turn, causes lamp 15 to begin producing light. L1, with the duty cycling of current, boosts timing supply voltage Vs as described for the dimmer depicted in FIG. 2. The photo detector Q2, until receiving light from lamp 15, presents a very high resistance which causes the On/Off duty cycle ratio to be high, but as lamp 15 brightens, Q2 drops quickly in resistance, reducing the On/Off ratio until equilibrium is reached, providing regulation in lamp brightness. Timing I.C. U1 operates much as it did in FIG. 2–4, producing duty cycle pulse width modulated wave form Vt to controlled switch Q1. This switch could also be a bipolar transistor; of course L1 then would not be necessary. For sake of argument, assume photo detector Q2 to be of a resistance that causes the duty cycling to be such that lamp 15 is a given brightness. C40 will begin charging via Q2 upon pin 7 of U1 ceasing to conduct to Vcc, which occurs simultaneously with Vt going high (to Vs) constituting the On cycle. In that Q2 is illuminated by and sensing regulated light and also is quite less in resistance than its maximum, C40 is charged quite rapidly, in less than a millisecond. The On cycle, as a result, remains about 0.8 msec across the range of regulation of lamp intensity with input voltage Vdd varied from 3.5 to 8 volts. So, unlike the input responsive lamp controller in FIG. 4, this illumination output regulator controls the Off cycle rather than the On cycle duration. The key to this feature is resistor R30. Upon C40 attaining the voltage of threshold, the Off cycle commences. Pin 7 of U1 then begins discharging C40 via R30, but also is attempting to discharge capacitor C2 via Q2. As a result, C40 is delayed in its discharge depending on the resistance of Q2 at that instant, because R30 behaves as a voltage divider with Q2, isolating C40 from the discharge path of pin 7. This delays the occurrence of trigger which begins the On cycle, and therefore allows Q2 to control the Off cycle duration. The proportionate range of resistance change needed to effect this delay is comparatively small, and results in an abrupt alteration of duty cycle ratio which is quite advantageous in that it creates a high feedback loop gain, which, of course results in the lamp intensity being stabilized to within a few percent over more than a two-fold range of input voltage. Another advantage naturally results from the technique of varying the Off cycle duration: the pulse rate goes down with higher input voltages, which curbs the voltage multiplying factor of L1. Part of the mechanism for limiting Vs also derives from Q2 attempting to discharge C2 during the Off cycle. With a supply varied from 3.5 to 8 volts, Vs stays between 9.3 and 6.8 volts. Resistor R35 establishes a hysteresis for the trigger and threshold voltages, extending them to one sixth and five sixths of Vs respectively. This allows for both a lower prf, and especially, for better regulation flatness across the supply voltage range. Light path attenuation LA1 enables operator adjustable lamp intensity control, and allows considerable dimming of the lamp to be secured. At all dimmed settings, the lamp is totally regulated in output intensity level, and regulation extends down to about 0.8 volts above the rated lamp voltage in a 3 volt lamp application at full brightness setting.

In this disclosure, there is shown and described only the preferred embodiments of the invention, but, as aforementioned, it is to be understood that the invention is capable of use in various other combinations and variants and is capable of changes or modifications within the scope of the inventive concept expressed herein.

What is claimed is:

1. A two terminal low voltage lamp controller for placement in electrical series with a load and a direct current electrical power source, comprising:

a timing device;

an inductor;

an on-off switch controlled by said timing device, said switch also being connected in electrical series with said inductor;

a first electrical terminal;

a second electrical terminal, said first and second terminals being connected in electrical parallel with the series connected switch and inductor and also being the only terminals for connection to a series connected direct current electrical power source and load;

means for deriving an increased voltage from said inductor; and means for storing the increased voltage to produce a timing wave form of increased voltage for controlling said switch.

2. A lamp controller as recited in claim 1 wherein said means for deriving the increased voltage include rectification means for deriving the increased voltage in electrical parallel to said switch when said switch turns off, and said means for storing the increased voltage includes capacitance means.

3. A lamp controller as recited in claim 1 wherein said switch is an insulated gate field effect transistor.

4. A lamp controller as recited in claim 1 wherein the increased voltage provides power for said timing device.

5. A lamp controller as recited in claim 1 further comprising a bypass switch connected in electrical parallel with said first and second terminals.

6. A lamp controller as recited in claim 1 further comprising voltage multiplying means for starting the timing device.

7. A lamp controller as recited in claim 1 further comprising means for limiting the increased voltage.

8. A lamp controller as recited in claim 1 further comprising a Hall effect device for controlling said timing device.

9. A lamp controller as recited in claim 1 further comprising a digitally formatted control for controlling said timing device.

10. A lamp controller as recited in claim 2 wherein said rectification means is a diode.

11. A lamp controller as recited in claim 1 wherein the load is a lamp and said controller further comprises a light sensitive device for sensing light produced by the lamp to control said timing device.

12. A two terminal low voltage lamp controller for placement in electrical series with a load and a direct current electrical power source of a given voltage, comprising:

a timing device;

an on-off switch controlled by said timing device;

a first electrical terminal;

a second electrical terminal, said first and second electrical terminals being connected in electrical parallel with said switch and also being the only terminals for connection to a series connected direct current electrical power source and load;

means for deriving a voltage representing the given voltage of the electrical power source;

means for storing the derived voltage; and means for controlling said timing device with the stored voltage to keep the power to the load constant as the voltage of the direct current electrical power source changes.

13. A lamp controller as recited in claim 12 wherein the stored voltage representing the given voltage provides power for said timing device.

14. A lamp controller as recited in claim 12 wherein said means for deriving the voltage representing the given voltage includes rectification means for deriving voltage in electrical parallel to said switch when said switch turns off and wherein said means for storing the derived voltage includes capacitance means.

15. A lamp controller as recited in claim 14 herein said rectification means is a diode.

16. A lamp controller as recited in claim 12 further comprising second capacitance means connected in electrical parallel with the electrical power source.

17. A lamp controller as recited in claim 12 wherein said means for controlling said timing device includes a diode.

18. A lamp controller as recited in claim 12 wherein said means for controlling said timing device includes a digitally formatted control.

19. A lamp controller as recited in claim 12 wherein said means for controlling said timing device includes a linear amplifier.

20. A two terminal low voltage lamp controller for placement in electrical series with a lamp and a direct current electrical power source, comprising:

a timing device;

an inductor;

an on-off switch controlled by said timing device, said switch also being connected in electrical series with said inductor;

a first electrical terminal;

a second electrical terminal, said first and second terminals being connected in electrical parallel with the series connected switch and inductor and also being the only terminals for connection to a series connected direct current electrical power source and load;

means for deriving an increased voltage from said inductor;

means for storing the increased voltage to produce a timing wave form of increased voltage for controlling said switch; and a light sensitive device for sensing light produced by the lamp to control said timing device.

21. A lamp controller as recited in claim 20 wherein said means for deriving the increased voltage includes rectification means for deriving the increased voltage in electrical parallel to said switch when said switch turns off, and said means for storing the increased voltage includes capacitance means.

22. A lamp controller as recited in claim 21 wherein said rectification means is a diode.

23. A lamp controller as recited in claim 20 further comprising light path attenuator means for adjusting lamp brightness and regulating lamp brightness to keep the brightness of the lamp constant as the voltage of the direct current electrical power source changes.

* * * * *